United States Patent [19]

Scheibelhoffer et al.

[11] Patent Number: 5,443,768

[45] Date of Patent: Aug. 22, 1995

[54] ABRASIVE AND PURGE COMPOSITIONS

[75] Inventors: Anthony S. Scheibelhoffer, Norton; Dianna B. Dusek, Oakwood Village; Dennis L. Hammond, Richfield; Surachai Wimolkiatisak, Strongsville; William R. Myers, Bryan; Robert J. Opalko, Middleburg Heights; Richard L. Abrams, North Royalton, all of Ohio

[73] Assignee: The Ferro Corporation, Cleveland, Ohio

[21] Appl. No.: 171,062

[22] Filed: Dec. 21, 1993

[51] Int. Cl.⁶ .............................................. B08B 9/00
[52] U.S. Cl. ................................... 264/39; 134/7; 134/9; 134/22.1; 134/22.11; 134/22.19; 252/163; 252/174.23; 252/174.24; 252/174.25
[58] Field of Search .................. 134/7, 9, 22.1, 22.11, 134/22.19; 252/163, 174.23, 174.24, 174.25; 264/39

[56] References Cited

U.S. PATENT DOCUMENTS

| | | | |
|---|---|---|---|
| 4,838,945 | 6/1989 | Fujii et al. | 134/7 |
| 5,236,514 | 8/1993 | Leung et al. | 134/22.14 |
| 5,238,608 | 8/1993 | Obama et al. | 252/535 |

OTHER PUBLICATIONS

Derwent Abstract, DE 4,202,618, Aug. 6, 1992; "Cleaning Compositions for Thermoplastics Processing Machines—Comprising . . . ".

*Primary Examiner*—Hoa Van Le
*Attorney, Agent, or Firm*—Renner, Otto, Boisselle & Sklar

[57] ABSTRACT

This invention relates to an abrasive composition comprising (a) a major amount of at least one abrasive powder, (b) at least one resin selected from the group consisting of a polymer of a diene, a rosin material, a coumarone-indene resin, and a mixture of two or more thereof, and (c) at least one copolymer of an olefin and an acrylate or a methacrylate. The abrasive composition may additionally include (d) a surface active agent. The abrasive composition may be added to a polymer or resin to form purge compositions. The invention also relates to methods of cleaning processing equipment and preparing the abrasive compositions and purge composition.

24 Claims, No Drawings

ABRASIVE AND PURGE COMPOSITIONS

FIELD OF THE INVENTION

This invention relates to abrasive compositions, purge compositions and methods of preparing and using the same. These compositions and methods may be used in polymer processing equipment.

BACKGROUND OF THE INVENTION

Purge compositions are used in polymer processing equipment, such as extrusion and injection molding equipment, as a cleaning agent. The purge compositions are used when the material which is being processed in the equipment is changed. For instance, in processing equipment, a change in the color of polymer requires removal of the polymer containing the first color before introduction of a polymer containing a second color.

A number of purge compositions are currently available to the polymer processing industry. These compositions generally consist of a carder medium, containing a dispersion of abrasive particles. The current carrier media consist of liquids, low melting, low viscosity solids (e.g. waxes and polymers) or higher viscosity polymers.

The lower viscosity carders generally have an advantage over higher viscosity materials because they tend to be more compatible and mix with a broader range of polymer materials. Low viscosity carriers generally are able to accept high levels of abrasive material. The low viscosity materials generally have low molecular weights and are believed to produce a greater change in entropy upon mixing with other materials. When the entropy change is greater, then there is a greater chance that mixing will occur. The ability for a carder to mix with and remove polymers from the processing equipment is important for purging operations.

In addition, when mixing liquids of different viscosity, it is believed that the lower viscosity liquids will tend to encapsulate the high viscosity materials. Accordingly, a low viscosity carrier system would be useful for purging higher viscosity polymers. To be effective, a purge composition must transfer mechanical energy from the moving rotor, e.g. a screw, to the stationary walls of the processing equipment. A problem of low viscosity carriers is that low viscosity liquids do not efficiently transfer this mechanical energy. Another problem with low viscosity carders is that they lubricate the screws and rotors of the mixing equipment. Additionally, if the low viscosity carder is liquid at room temperature, then special processing equipment is required to disperse the abrasive material in the low viscosity carrier.

High viscosity carder resins for purge compositions are able to transfer mechanical energy in internal mixers for better cleaning action. However, as the level of abrasive material is increased in high viscosity carder systems, the viscosity of the purge composition increases, making processing more difficult. High loading levels of particulate material also reduce the inherent strength of the mixture, making processing into pellets difficult. Also, they do not mix well with other polymers due to the low entropy change upon mixing.

Therefore, it is desirable to have abrasive compositions and purge compositions which efficiently transfer mechanical energy, with little or no screw slippage. It is desirable to have abrasive compositions and purge compositions which are effective at removing polymers from the processing equipment. It is also desirable to have abrasive compositions and purge compositions provide a means for rapid polymer change-over. It is desirable to have an abrasive composition which provides the benefits of low viscosity carders with the benefits of the high viscosity carder, while avoiding the deficiencies of these carriers.

SUMMARY OF THE INVENTION

This invention relates to an abrasive composition comprising (a) a major amount of at least one abrasive powder, (b) at least one resin selected from the group consisting of a polymer of a diene, a rosin material, a coumarone-indene resin, and a mixture of two or more thereof, and (c) at least one copolymer of an olefin and an acrylate or a methacrylate ester. The abrasive composition may additionally include (d) a surface active agent. The abrasive composition may be added to a polymer or resin to form purge compositions. The invention also relates to methods of cleaning processing equipment and preparing the abrasive compositions and purge compositions.

These purging compositions allow fast and effective purging of polymer processing equipment. These materials reduce the time and the amount of material needed for purging operations. These materials cause little or no screw slippage. These compositions may also be reused, i.e., used for more than one purging operation. The purging compositions may be prepared in normal processing equipment, such as an extruder. Also, the abrasive compositions are compatible with a broad range of resins. The abrasive compositions and purge composition are nontoxic and, after use, may be used or worked off as filler in polymer products.

DETAILED DESCRIPTION OF THE PREFERRED EMBODIMENTS

Throughout this specification and the claims, the term "major amount" means more than 50% by weight such as, for example, 50.1%, 60%, 70%, etc. The term "minor amount" means 50% or less than 50% based on the total weight of the mixture. Of course, regardless of the number of components present, the total amount cannot exceed 100%.

(A) Abrasive Compositions (a) Abrasive Powders

As described above, the abrasive compositions contain an abrasive powder (a). The amount of abrasive powder may be varied over a wide range depending upon the intended utility of the composition and the preferences of the user. Generally, the abrasive composition will contain at least 60%, or at least about 75% by weight of the abrasive powder (a). The abrasive composition may contain up to about 85%, or up to about 90% by weight of the abrasive powder.

The abrasive powder generally has a Mohs hardness greater than about 2. In one embodiment, the abrasive powder has a Mohs hardness from about 2 to about 9, or from about 2 to about 8, or from about 3 to about 6. Here, as well as elsewhere in the specification and claims, the range and ratio limits may be combined. The abrasive powder may be any powder useful as a scouring agent. Examples of the abrasive powders include calcium carbonate, aluminum oxide, titanium dioxide, silica, kaolin, wollasonite, mica, and mixtures of two or more thereof. In one embodiment, the abrasive powder comprises a major amount of calcium carbonate. In another embodiment, the abrasive powder is a treated powder. Typically the treated powder is a powder which is treated with a surface active agent. An example of a surface active agent is a fatty acid. Fatty acids have from 8 to about 30, or from about 12 to about 24, or from about 16 to about 22 carbon atoms. Fatty acids include stearic, laurie, and oleic acid.

Examples of commercially available calcium carbonates useful in the present invention include MARBLEMITE®, SUPERMITE®, and SUPERCOAT® calcium carbonates available from ECC America, Inc., Sylacauga, Alabama. MARBLEMITE® is a dry ground natural white calcium carbonate containing a distribution of fine, medium and coarse particles, and having a mean particle diameter of about eighty microns. Three percent of the powder is retained on a forty mesh screen while 45% by weight of the powder passes through a two-hundred mesh screen. SUPERMITE® is an extra-fine ground natural calcium carbonate having a mean particle diameter of one micron. SUPERCOAT® is a stearic acid treated calcium carbonate having a mean particle diameter of one micron.

In one embodiment, the abrasive powder (a) comprises a mixture of (i) a major amount of calcium carbonate having a mean particle diameter from about 25 up to about 500 microns and (ii) a minor amount of a calcium carbonate having a mean particle diameter from about 0.1 to about 10 microns. In one embodiment, (i) has a mean particle diameter from about 30 to about 250, or from about 40 to about 150 microns. In another embodiment, (ii) has a mean particle diameter from about 0.5 to about 5, or from about 0.7 to about 3 microns. Generally, (i) is present in an amount from about 25% to about 75%, or from about 40% to about 70%, or from about 45% to about 65% by weight of the abrasive composition. Generally, (ii) is present in an amount from about 5% to about 40%, or from about 10% to about 30%, or from about 15% up to about 25% by weight of the abrasive compositions.

In another embodiment, the abrasive powder is a mixture of calcium carbonate and titanium dioxide. The calcium carbonate may be any of the calcium carbonates described herein. The titanium dioxide typically has a mean particle diameter from about 0.05 to about 2, or from about 0.07 to about 1, or from about 0.1 to about 1 microns. The titanium dioxide is generally present in an amount from about 0.1% to about 15%, or from about 1% to about 10%, or from about 2% to about 6% by weight.

(b) Low Viscosity Resins

The abrasive compositions and methods also use a low viscosity resin (b). Typically the resin has a viscosity from about 500 to about 3000, or from about 600 to about 2000, or from about 800 to about 1500 poise at 110° C. at a shear rate of 100 sec$^{-1}$. The viscosities are measured in a cone and plate (Haake) viscometer. Examples of low viscosity resins include at least one polymer of a diene, at least one rosin ester, at least one coumarone-indene, resin and at least one mixture of two or more thereof. These resins generally are solid at room temperature and have a softening point from about 60° C. to about 200° C., or from about 80° C. to about 120° C. Typically, (b) is present in an amount from about 5% to about 25%, or from about 7% to about 20%, or from about 9% to about 15% by weight of the abrasive composition.

In one embodiment, (b) has a solubility parameter from about 10 to about 30, or from about 15 to about 25 (MPa)$^{\frac{1}{2}}$. As used here, as well as elsewhere in the specification and claims, the term "solubility parameter" and its values are defined in *Polymer Handbook*, Third Edition, pgs. 519 et seq.

In one embodiment, (b) is a polymer of a diene. The polymer may be a homopolymer or a copolymer of a diene and another monomer, such as ethylene, propylene, or styrene. Preferably, the diene polymer is a homopolymer. The diene polymer include those having a $\overline{M}n$ from about 400 up to about 4000, or from about 500 up to about 3000, or from about 700 up to about 1000. The diene may contain from about 4 to about 18, or from about 4 to about 8 carbon atoms. Examples of dienes include 1,3-butadiene, 1,3-pentadiene, 1,4-pentadiene, isoprene, 1,3-hexadiene, 1,4-hexadiene, 1,3-heptadiene, 1,4-heptadiene, 1,5-heptadiene, 1,3-octadiene, 1,4-octadiene, 1,5-octadiene, and 1,6-octadiene. Examples of useful polymers include polybutadiene, polypiperylene, polyisoprene, polyhexadiene, and polyoctadiene. In one embodiment, the polymer of the diene is a homopolymer. Commercially available polymers of dienes include polybutadienes, such as AMERIPOL, and SYNPOL from Ameripol Synpol Co., and BUNA from Mobay Corp.; polyisoprene, such as NATSYN from Goodyear Tire & Rubber Co.; and polypiperylene, such as PICCOPALE 100 from Hercules. PICCOPALE 100 has a $\overline{M}n$ of 890, a $\overline{M}w$ of 2350, a $\overline{M}w/\overline{M}n$ of 2.6, a viscosity of 1080 poise at 110° C. and a shear rate of 100 sec$^{-1}$ and a solubility parameter of 17.96 (MPa)$^{\frac{1}{2}}$.

In another embodiment, (b) is at least one organic rosin material. The organic rosin materials are known in the art and are available from a variety of commercial sources. Such materials are based upon or derived from gum, wood and/or tall oil rosins which are mainly a mixture of fused-ring, monocarboxylic acids typified by levo-pimarie acid, abietic acid and isomers thereof having the empirical formula $C_{19}H_{29}COOH$. Other acids, such as dihydroabietie acid ($C_{19}H_{31}COOH$) and dehydroabietic acid ($C_{19}H_{27}COOH$), may also be present in the rosin materials. The rosin materials also include non-polymerie derivatives of rosin acids, such as esters, addition salts, hydrogenates, reduction products and the like. Suitable rosin materials generally have a melt viscosity of 500 to about 3000 poise at 110° C. and have a softening point (Hercules drop method) from about 60° C. up to about 200° C., or from about 80° C. up to about 120° C. The organic rosin materials may have an acid number from 0 to about 180, or from about 3 to about 100, or from about 5 to about 40.

Representative examples of rosin materials include those based upon: esters derived from rosin. In one embodiment, the rosin material is a polyol rosin ester. Rosin is composed primarily of pimaric-type acid esters and/or abietic acid esters, including glycerol esters, pentaerythritol esters, triethylene glycol esters, and the like, and their hydrogenates and/or reduction products. Specific examples of organic rosin materials available from Hercules include: STAYBELITE®, a partially hydrogenated (50%) wood rosin; STAYBELITE® ester 10, a glycerol ester of STAYBELITE®; POLYPALE Resin, 90% abietic acid and/or pimaric type acids and/or isomers thereof; Cellolyn 102, a pentaerythritol rosin ester, modified, having a solubility parameter of 23.37 (MPa)$^{\frac{1}{2}}$ and, preferably, PENTALYN A, a pentaerythritol rosin ester having a viscosity of 1434 poise at 110° C. at a shear rate of 100 sec$^{-1}$, and a solubility parameter 15.1–20.3 (MPa)$^{\frac{1}{2}}$.

In another embodiment, (b) of the abrasive composition is a coumarone-indene resin. These resins are also known as coal tar resins. These resins are derived from cracked petroleum distillates, turpentine fractions, and coal tar. Examples of commercially available coumarone-indene resins include CUMAR R-6, R-9, and R-15 from Neville Chemical Co. A useful coumarone-indene resin is Piccoumarone 45OL from Penn. Ind. Chem. and having a solubility parameter of 20.99 (MPa)$^{\frac{1}{2}}$.

(c) Olefin-Acrylic Ester Copolymer

The abrasive composition (A) also includes (c) at least one copolymer of an olefin and an acrylic or methacrylic ester. The abrasive compositions generally contain from about 1% to about 25%, or from about 2% to about 20%, or from about 4% to about 15% by weight of (c). The copolymers typically have a melt index from about 0.5 to about 50, or from about i to about 40, or from about 10 to about 30 gm/10 min. Melt index is measured at 190° C. using a 2160 gram weight (ASTM D1238). Typically, (c) has a solubility parameter from about 10 to about 30, or from about 15 to about 25 (MPa)$^{\frac{1}{2}}$.

In one embodiment, the olefin used to prepare the copolymer (c) contains from 2 to about 18, or from 2 to about 8 carbon atoms. The olefin is preferably ethylene, propylene, or butyiene. Typically, from about 40% to about 95%, or from about 60% to about 90%, or from about 70% to about 85% by weight olefin is used to prepare the copolymer (c).

The acrylic or methacrylic esters, used in preparing the copolymer (c), are esters having from 1 to about 30, or from 1 to about 18, or from 1 to about 8 carbon atoms in the ester group. Preferred esters are methyl, ethyl, propyl, and butyl esters of acrylic and methacrylic acid. Generally, from about 5% to about 60%, or from about 10% to about 40%, or from about 15% to 30% by weight acrylic or methacrylic acid ester is used to prepare the copolymer.

The copolymers of the olefin and the acrylic or methacrylic esters may be prepared by procedures well known to those skilled in the polymer art. Many such copolymers are available commercially. Examples of specific copolymers include ethylene methyl acrylate copolymers (EMAC) such as those commercially available from Chevron under the designations SP2205, SP2220, SP2255 and SP2260 having methyl acrylate contents of 20%, 20%, 18% and 24% by weight, respectively; from Exxon under the general trade designations "ESCOR" and available in commercial grades designated, e.g., TC110 and TC112 containing 20% and 18% methyl acrylate, respectively. Developmental ESCOR grade copolymers are also available from Exxon containing from 6% by weight of methyl acrylate (XS 11.04) to 28% by weight of methyl acrylate (XS 21.04 and 55.48). LOTRYL 3610 is an ethylene-methyl acrylate copolymer having a methyl acrylate content of 29% by weight and is available from Atochem, Inc. Some developmental EMAC are also available from Chevron under trade designations such as TD1956, TS1967, and TD1972, and these contain 6%, 35%, 42% and 60% by weight of methyl acrylate, respectively.

Also useful are ethylene ethyl acrylates (EEA) such as those available from Union Carbide under the BAKELITE designations DPD-6182, DPD-6169 and DPDA 9169. EBAs (ethylene butyl acrylates) are available from Atochem, Inc. under designations such as 17BG04 (15–18% ester content) and 30BA02 (28–32% ester content). Ethylene butyl acrylate copolymers are also available from Chevron under the trade designation EBAC ® 1255-70, 1122-70 and 1260-70 and contain from to about 30% butyl acrylateo A particularly useful ethylene acrylic ester copolymer is an ethylenemethacrylic acid ester available commercially under the tradename PRIMACOR ® from Dow Chemical Company. A particularly useful PRIMACOR ® resin is a PRIMACOR ® 5981. Another useful alpha-olefin acrylic acid copolymer is an ethylene methylacrylate copolymer sold under the tradename VAMAC ® ethylene/acrylic elastomers available commercially from DuPont Company. A particularly useful VAMAC ® resin is VAMAC ® G elastomer.

(d) Surfactants

The abrasive compositions also optionally include (d) at least one surface active agent. The surface active agents may be nonionic, cationic, anionic, or amphoteric in nature so long as abrasive compositions can be produced with high loading of abrasive powder and the compositions are stable. These surface active agents or surfactants are known in the art, and many of these are described in McCutcheon's "Volume 1: Emulsifiers and Detergents", 1992, North American Edition, published by McCutcheon's Division, MC Publishing Corp., Glen Rock, N.J., and in particular, pp. 263–274 which lists a number of cationic, anionic, nonionic and amphoteric surfactants is hereby incorporated by reference for the disclosure in this regard. The amount of the surface active agent included in the abrasive compositions of the present invention may be varied within a range from about 0.1% to about 10%, or from about 0.5% to about 5%. or from about 0.7% to about 2% by weight of the abrasive composition.

One class of surfactants useful in the practice of the present invention includes those based upon polyesters of hydroxy carboxylic acids of the general formula HO—R—COOH, where R is a divalent hydrocarbon group having at least about 8 carbon atoms; and polyesters prepared from mixtures of such hydroxy carboxylic acids with a carboxylic acid that is free from hydroxy groups. Representative examples of such hydroxy carboxylic acids include ricinoleic acid, mixtures of 9- and 10-hydroxystearic acid and 12-hydroxystearic acid (HSA). Representative examples of carboxylic acids that are free of hydroxy groups are fatty acids, such as laurie acid, palmitic acid, stearic acid and oleic acid. Mixtures of 9- and 10-hydroxystearie acid can be obtained by sulfonation of oleic acid followed by hydrolysis. Sources for 12-hydroxystearic acid include commercially available hydrogenated castor oil fatty acid, which contains minor amounts of stearic acid and palmitic acid. Representative examples of suitable polyester surfactants include: poly-(12-hydroxystearic acid) surfactants. These surfactant may have from about 7 to about 12 polymeric units of 12-hydroxystearic acid. In addition to the 12-hydroxystearic acid, such surfactants may contain a lower level of stearic acid. Also, some of the hydroxy end groups of the poly-(12-hydroxystearic acid) surfactants may be capped with regular stearic acid which has no 12-hydroxy group. A specific example of a suitable poly(12-HSA) surfactant is HYPERMER ® LP-1 from ICI which has a degree of polymerization of about 9.

Another class of surface active agents are derivatives of polyester surfactants wherein at least a portion of the acid end groups are amidized. The polyester suffactants can be amidized with N,N-dialkyl-1,3-alkanediamine, for example, N,N-dimethyl-1,3-propanediamine to form end groups. The alkyl and alkane groups generally contain from about 1 to about 8 carbon atoms. HYPERMER ® LP-4 available from ICI is a specific example of a suitable amidized polyester is a poly(12-HSA) surfactant wherein about two-thirds of the acid end groups are amidized with N,N-dimethyl-1,3-propanediamine.

The surfactants may also be glycerides and glyceride derivatives. Examples of these nonionic suffactants include glyceride esters, such as the mono-, di- or triglycerides. The glycerides have acyl groups generally containing from about 3 to about 30, or from about 8 to about 30, or from about 10 to about 26, or from about 12 to about 20 carbon atoms. Examples of acyl groups include n-dodecanoate, n-tetradecanoate, n-hexadecanoate, n-octadecanoate, n-eicosanoate, cis-$\Delta^9$-hexadecenoate, and cis-$\Delta^9$-octadecenoate Many of these glyceride esters occur naturally in animal and vegetable fats and oils. Examples of these fats and oils include corn oil, coconut oil, soybean oil, sunflower oil, cottonseed oil, palm oil, tallow, bacon grease, butter, castor oil, tall oil and rosin. The natural oils may also be hydrogenated, sulfated or sulfonated. One useful derivative is obtained by reacting a natural oil, such as corn oil, with an unsaturated acid or anhydride, such as maleic anhydride. Particular examples of useful glycerides include glycerol monodicaprylate, glycerol dicaprylate, glycerol myristate, glycerol 1,3-distearate, glycerol monolaurate, glycerol monooleate, glycerol monoricinoleate, glycerol monostearate, glycerol tributyrate, glycerol tripropionate, glycerol tristearate, glyceryl trioleate, glyceryl tripalmitate, glyceryl triricinoleate, and mixtures thereof.

Useful glyceride derivatives are available commercially from Pflaumer Brothers Inc., Norristown, Pa. under trade designations, such as TALLICIN Dispersant K-2 and Ester 253. Other glyceride-based dispersants are available from: Huls America Inc. under such trade designations as IMWITOR 440 identified as mono/diglyeeride of natural oils, IMWITOR 742 identified as glyeerol mono/diester of medium chain fatty acids. IMWITOR 908 identified as glyceryl mono/-dicaprylate, etc., from Eastman Chemical Co. under the trade designations as MYVEROL SMG VK (succinylated distilled monoglyeerides from hydrogenated palm oil or palm stearin); MYVATEX 3-50K Colend of vegetable-fat-derived distilled monoglycerides and distilled propylene glycol monostearate); etc.

In one embodiment, the abrasive compositions of the present invention contain less than about 0.1%, or less than about 0.05%, or less than about 0.01% by weight of water. In one embodiment, the abrasive compositions are substantially free of water.

(d) Foaming Agents

The abrasive compositions may also contain at least one foaming agent (d). For example, it may be desirable to utilize a foamable abrasive compositions to force the concentrate into remote or difficult to reach areas of the plastics processing equipment. The foaming agents may be either physical or chemical foaming agents, which are heat-sensitive chemicals that undergo a decomposition reaction upon heating to produce both gas and solid decomposition products.

The most common types of physical foaming agents are fluorocarbons, chlorofluorocarbons, hydrofluorocarbons, hydrochlorofluorocarbons, hydrocarbons, and compressed gasses, such as nitrogen and carbon dioxide. The use of these materials requires that the foaming agent be mixed with the polymer under conditions of temperature and pressure that will allow the foaming agent to stay as a liquid. Foaming is brought about by changes in temperature and/or pressure which cause the agent to vaporize and cause foaming.

The chemical foaming agents which may be utilized in the present invention may be either organic or inorganic foaming agents. Examples of chemical foaming agents include inorganic carbonate and bicarbonates, such as sodium bicarbonate, mixtures of polycarbonic acids and carbonates, nitrogen foaming agents, such as azodicarbonamide and diisopropylhydrazodicarboxylate, metal trihydrates, such as aluminum trihydrate, etc. Commercially available foaming agents include Hydrocerol from Boehringer Ingelheim, Unicell from Dong Jin Chemical, Expandex, Kempore, Nitropore and Opex from Olin Corp. and Celogon from Uniroyal Chemical.

The amount of foaming agent required to provide the desired properties can be readily determined by one skilled in the art. Generally, only small amounts of the foaming agent are required, and these amounts may range from about 0.1% to about 10% by weight based on the total weight of the purge composition.

The abrasive compositions may be prepared by any means known to those in the art. In one embodiment, the abrasive composition is prepared in a two step process. In the first step, the dry components of the composition are blended in a high intensity mixer, such as a Prodex or Henschel mixer. If a liquid component, such as a surfactant, is included in the formula, it is added to the dry components while they are being blended in the high intensity mixer. In the high intensity mixer, the temperature is maintained below the temperature of the lowest melting component of the mixture. In the second step, the blended ingredients from the first step are melt mixed in an internal mixer, such as an extruder or Banbury mixer. This is followed by pelletizing or grinding the cooled mixture.

The details of mixing can be illustrated with the preparation of Example 8 below. The treated calcium carbonate (ECC), SUPERCOAT, titanium dioxide (Kerr-McGee CR 834), polypiperylene (Hercules PICCOPALE 100) and ethylene methyl acrylate copolymer (Chevron EMAC SP2220) are added to a Henschel high intensity mixer. After two minutes of mixing on low speed with a tip speed of 20 m/sec, the surface active agent GALLICIN K-2) is added slowly to the batch while continuing to mix on low speed.

The blended mixture from the previous process is fed into an 80 mm twin screw extruder (APV). The extruder barrel temperature profile ranged from 127 to 149° C. The screw speed was set at 160 rpm. This gave an output rate of 175.5 kilograms per hour. The extrudate was passed through a 3.1 mm diameter three hole die to produce strands which were discharged to a water slide pelletizing system (Conair Jetro).

The following examples illustrate the abrasive compositions and purge compositions utilized in the present invention and preparation of such abrasive mixtures. Unless otherwise indicated in the following examples and elsewhere in the specification and claims, all parts and percentages are by weight, temperatures are in degrees centigrade, and pressure is at or near atmospheric pressure.

| Abrasive compositions | Parts by Weight |
|---|---|
| Example 1 | |
| Calcium carbonate | 82 |
| PICCOPALE 100 | 13 |
| SP2220 (20% MA) | 5 |
| Example 2 | |
| Calcium carbonate | 82 |
| PENTALYN A | 13 |
| SP2220 (20% MA) | 5 |
| Example 3 | |
| Calcium carbonate | 82 |
| CUMAR R-6 | 13 |
| SP2220 (20% MA) | 5 |
| Example 4 | |
| Calcium carbonate | 80 |
| Titanium dioxide | 5 |
| PICCOPALE 100 | 10 |
| ESCOR TC112 (18% MA) | 5 |
| Example 5 | |
| Calcium Carbonate | 78 |
| Titanium dioxide | 4 |
| PENTALYN A | 11 |
| LOTRYL 3610 (29% MA) | 7 |
| Example 6 | |
| Calcium Carbonate | 80 |
| Titanium dioxide | 4 |
| CUMAR R-6 | 10 |
| LOTRYL 3610 (29% MA) | 6 |
| Example 7 | |
| MARBLEMITE TM calcium carbonate | 56 |
| SUPERMITE ® calcium carbonate | 20 |
| Titanium dioxide (Kerr McGee CR834) | 4 |
| PICCOPALE 100 | 12.4 |
| SP2220 (20% MA) | 6.6 |
| TALLICIN K-2 | 1 |
| Example 8 | |
| MARBLEMITE TM calcium carbonate | 56 |
| SUPERMITE ® calcium carbonate | 20 |
| Titanium dioxide (Kerr McGee) | 4 |
| PENTALYN A | 12.4 |
| SP2220 (20% MA) | 6.6 |
| TALLICIN K-2 | 1 |
| Example 9 | |
| SUPERCOAT treated calcium carbonate | 76 |
| Titanium dioxide (Kerr McGee) | 4 |
| PICCOPALE 100 | 12.4 |
| SP2220 (20% MA) | 6.6 |
| TALLICIN K-2 | 1 |
| Example 10 | |
| SUPERCOAT treated calcium carbonate | 76 |
| Titanium dioxide (Kerr McGee) | 4 |
| PENTALYN A | 12.4 |
| SP2220 (20% MA) | 6.6 |
| TALLICIN K-2 | 1 |
| Example 11 | |
| SUPERCOAT treated calcium carbonate | 76 |
| Titanium dioxide (Kerr McGee) | 4 |
| CUMAR R-6 | 12.4 |
| SP2220 (20% MA) | 6.6 |
| TALLICIN K-2 | 1 |
| Example 12 | |
| MARBLEMITE TM calcium carbonate | 56 |
| SUPERMITE ® calcium carbonate | 20 |
| Titanium dioxide (Kerr McGee CR834) | 4 |
| PICCOPALE 100 | 12.4 |
| SP2220 (20% MA) | 6.6 |
| TALLICIN K-2 | 1 |
| Aluminum trihydate | 0.5 |

The abrasive compositions of the present invention are multi-component systems which provide effective purging of polymer processing equipment. The compositions of the present invention may be used in extruders as well as injection or blow molding apparatus and are especially useful when changing from one color to another. Also, dirt and contamination which is caused, for example, by burning or oxidation of chemicals, may be removed by the compositions of the present invention. The abrasive compositions described above are useful in cleaning polymer processing equipment without the addition of other resins. The abrasive compositions are added to the polymer processing equipment, and the equipment is operated. These steps may be repeated until the processing equipment is cleaned.

PURGE COMPOSITIONS

As described above the abrasive compositions are useful alone to clean processing equipment, however the abrasive compositions may also be used in purge compositions. The purge compositions include a polymer or resin (B). The purge compositions comprise (A) a minor amount of the abrasive compositions described above and (B) a major amount of at least one polymer or resin. In one embodiment, the abrasive composition is present in the purge composition in amounts from about 1% to about 20%, or from about 5% to about 15%, or from about 8% to about 12% by weight. The polymer (B) is present in an amount from at least about 70%, or at least about 80%, or at least about 90% by weight of the purge composition polymer. (B) is other than (b) and (c) above.

(B) Polymers

A wide variety of polymers and resins may be utilized in the purge compositions of the present invention. These include thermoplastic, as well as, thermosetting polymers and resins. Among the thermoplastic polymers which may be utilized in the purge compositions of the present invention are polyolefins and olefin copolymers, polyesters, polyphenylene ether resins (PPO), polystyrene and styrene copolymers, polyamides, polyimides, polyurethanes, acrylic resins, polycarbonates, ABS resins, etc. Examples of thermosetting resins which may be utilized in the purge compositions of the present invention include allyl polymers, epoxy resins, phenolic resins, thermosetting polyesters, urea and melamine formaldehyde resins, etc.

Examples of polyolefins and olefin copolymers include, for example, polyethylene, polypropylene, ethylene propylene copolymers, polybutylene, EVA, etc. Various forms of polyethylene can be utilized including low-density polyethylene, high-density polyethylene, etc. Examples of styrene copolymers include styrene-maleic anhydride copolymer (SMA), styrene-acrylonitrile copolymer (SAN), styrene-methylacrylate copolymers, styrene-butadiene or styrene-isoprene block copolymers. Nylon is an example of a useful thermoplastic polyamide. PET and PBT are examples of useful polyesters. The selection of a particular polymer for use in the purge compositions of the present invention will depend in part upon the intended use of the purge composition and, in particular, the nature of the composition within the plastics processing equipment which is to be purged, and the selection of a polymer can be readily made by one skilled in the art depending on the particular application and the user's preferences.

The purge compositions may be prepared by blending the components of the purge compositions as is known to those in the art. For example the abrasive composition may be blended into the polymer by mixing in a ribbon blender or tumble blender. The purge compositions may also be prepared insitu during equipment cleaning by proportionally feeding the components of the purge compositions (A) and (B) and optionally (C), into the polymer processing equipment.

The following examples purge compositions of the present invention.

| Purge Compositions | |
|---|---|
| | Percent by Weight |
| Example A | |
| Polypropylene | 90 |
| Abrasive composition of Example 1 | 10 |
| Example B | |
| High density polyethylene (HDPE) | 95 |
| Abrasive composition of Example 4 | 5 |
| Example C | |
| Polystyrene | 93 |
| Abrasive composition of Example 7 | 7 |
| Example D | |
| Noryl ® (PPO blend) | 94 |
| Abrasive composition of Example 7 | 6 |
| Example E | |
| HDPE | 93 |
| Abrasive composition of Example 9 | 7 |
| Example F | |
| Polystyrene | 94 |
| Abrasive composition of Example 12 | 6 |

The purge compositions described above are useful in purging polymer processing machinery such as extruders, Banbury mixers, etc. The process is described below in an injection molding machine. However, the invention is generally applicable to other polymers processing equipment.

For example, the abrasive and/or purge compositions may be used to purge an injection molding machine which has been used to mold plastic parts of pigmented polymer, such as pigmented polystyrene. The abrasive and/or purge composition is introduced into the injection molding machine, and the composition is passed through the machine as molding is commenced. The injection molding machine is operated until the molded composition exiting the machine appears clean which indicates that the internal parts of the machine are clean. The abrasive and/or purge composition is then flushed from the equipment with the next resin or color to be run.

The compositions of the present invention provide effective purging characteristics such that color changes may be made in the processing equipment in a faster time with less amount of purge composition required for changeover. The compositions of the invention are compatible with a variety of thermoplastic polymers including high-density polyethylene, low-density polyethylene, polystyrene, polyamides, etc. Furthermore, the purge compositions of the present invention are stable and can be re-used. In addition, the compositions of this invention are nontoxic. They may be included or "worked off" in polymer products to avoid the need for disposal.

A purge composition, comprising 10 parts of Example 9 and 100 parts of polypropylene which are premixed, is added to injection molding equipment. Twenty pounds of purge composition is required for successful cleaning. By comparison, 60–100 pounds of neat polypropylene are required for successful cleaning. Likewise, a purge composition, comprising 10 parts of Example 9 and 100 parts of polystyrene which are premixed, is used in a Banbury mixer. The purge composition cleans the equipment in one hour, while neat polystyrene without purge composition takes eight hours to successfully clean the equipment. Steam cleaning is also needed with the neat polystyrene.

As can be seen, the purge compositions are useful in cleaning polymer processing equipment. While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method of purging polymer processing equipment comprising the steps of (1) adding at least one abrasive composition comprising (a) a major amount of at least one abrasive powder, (b) at least one resin selected from the group consisting of a homopolymer of a diene or a copolymer of a diene and a monomer selected from the group consisting of ethylene, propylene and styrene, a rosin material, a coumarone-indene resin, and a mixture of two or more thereof, and (c) at least one copolymer of an olefin and an acrylate or a methacrylate to the processing equipment, and (2) operating the equipment.

2. The method of claim 1 wherein the abrasive powder has a Mobs hardness of at least about 2.

3. The method of claim 1 wherein the abrasive powder (a) is selected from the group consisting of calcium carbonate, aluminum oxide, titanium dioxide, silica, kaolin, wollasonite, mica, and mixtures of two or more thereof.

4. The method of claim 1 wherein the abrasive powder (a) comprises a mixture of (i) a major amount of calcium carbonate having a mean particle diameter from about 25 up to about 500 microns and (ii) a minor amount of a calcium carbonate having a mean particle diameter from about 0.1 to about 10 microns.

5. The method of claim 1 wherein the abrasive powder is a mixture of calcium carbonate and titanium dioxide.

6. The method of claim 1 wherein the abrasive powder is treated with a surface active agent.

7. The method of claim 6 wherein the surface active agent is a fatty acid.

8. The method of claim 1 wherein (b) has a viscosity from about 500 to about 3000 poise at 110° C. at a shear rate of 100 sec$^{-1}$.

9. The abrasive composition of claim 1 wherein (b) is at least one homopolymer of at least one diene or at least one copolymer of a diene and a monomer selected from the group consisting of ethylene, propylene and styrene.

10. The method of claim 9 wherein the diene has from 3 to about 12 carbon atoms.

11. The method of claim 9 wherein the diene is selected from the group consisting of butadiene, pentadiene and isoprene.

12. The method of claim 1 wherein (b) is polypiperylene.

13. The method of claim 1 wherein (c) has a melt index from about 0.5 to about 50 gm/10 min.

14. The method of claim 1 wherein (c) is a copolymer of ethylene, propylene, or butylene, and a methyl, ethyl, propyl or butyl ester of acrylic acid or methacrylic acid.

15. The method of claim 1 wherein (c) is an ethylene-acrylate or methacrylate or butylene-acrylate or methacrylate copolymer.

16. The method of claim 1 wherein (a) is present in an amount from at least about 60% by weight, (b) is present in an amount from about 5% to about 25% by weight, and (c) is present in an amount from about 2% up to about 15% by weight.

17. The method of claim 1 further comprising (d) a surface active agent.

18. The method of claim 17 wherein (d) is a glyceride ester.

19. The method of claim 17 wherein (d) is present in an amount from about 0.1% to about 2%.

20. The method of claim 1 further comprising (C) at least one foaming agent.

21. A method of purging polymer processing equipment comprising the steps of (1) adding at least one abrasive composition of claim 17 to the processing equipment, and (2) operating the equipment.

22. A method of purging polymer processing equipment comprising the steps of (1) adding at least one purge composition comprising: (A) a minor amount of the abrasive composition of claim 1, and (B) a major amount of at least one polymer to the processing equipment, and (2) operating the equipment.

23. A method of purging polymer processing equipment comprising the steps of (1) adding at least one purge composition comprising: (A) a minor amount of the abrasive composition of claim 17, and (B) a major amount of at least one polymer to the processing equipment, and (2) operating the equipment.

24. The method of claim 1 wherein the abrasive powder is present in an amount from at least about 60% by weight.

* * * * *

UNITED STATES PATENT AND TRADEMARK OFFICE
CERTIFICATE OF CORRECTION

PATENT NO. : 5,443,768

DATED : August 22, 1995

INVENTOR(S) : Scheibelhoffer et al.

It is certified that error appears in the above-identified patent and that said Letters Patent is hereby corrected as shown below:

Column 12, line 49,

In claim 9, line 1, delete "abrasive composition" and substitute --method--.

Signed and Sealed this

Thirteenth Day of August, 1996

Attest:

BRUCE LEHMAN

Attesting Officer

Commissioner of Patents and Trademarks